United States Patent
Daly et al.

(10) Patent No.: US 8,057,681 B2
(45) Date of Patent: Nov. 15, 2011

(54) WASHER BATH USING CENTRIFUGE AND ULTRA FILTER

(75) Inventors: John F. Daly, Hurricane, WV (US); Charles Harris, Ann Arbor, MI (US)

(73) Assignee: Toyota Motor Engineering & Manufacturing North America, Erlanger, KY (US)

( * ) Notice: Subject to any disclaimer, the term of this patent is extended or adjusted under 35 U.S.C. 154(b) by 240 days.

(21) Appl. No.: 12/323,584

(22) Filed: Nov. 26, 2008

(65) Prior Publication Data

US 2010/0126933 A1    May 27, 2010

(51) Int. Cl.
*B01D 61/00* (2006.01)
*B01D 63/00* (2006.01)

(52) U.S. Cl. .................. 210/651; 210/195.1; 210/195.2; 210/257.2; 210/96.2; 134/10

(58) Field of Classification Search .................. 210/650, 210/651, 652, 134, 96.1, 96.2, 195.2, 195.1, 210/257.2, 321.64; 134/10, 61, 109, 110
See application file for complete search history.

(56) References Cited

U.S. PATENT DOCUMENTS

| | | | |
|---|---|---|---|
| 2,903,002 A | 9/1959 | Adkins | |
| 3,430,851 A | 3/1969 | Abt | |
| 3,658,249 A | 4/1972 | Sharpe | |
| 5,277,208 A | 1/1994 | Mansur | |
| 5,393,390 A * | 2/1995 | Freese et al. | 210/650 |
| 5,423,340 A | 6/1995 | Campbell et al. | |
| 5,490,939 A * | 2/1996 | Gerigk et al. | 210/652 |
| 5,501,741 A * | 3/1996 | McMahon | 134/13 |
| 5,525,371 A * | 6/1996 | Sweeney et al. | 427/327 |
| 5,527,974 A * | 6/1996 | Jeromin et al. | 568/869 |
| 5,820,690 A * | 10/1998 | Rolchigo et al. | 134/10 |
| 5,868,937 A * | 2/1999 | Back et al. | 210/651 |
| 5,954,071 A | 9/1999 | Magliocca | |
| 6,405,877 B1 | 6/2002 | Nemedi et al. | |
| 7,018,539 B2 * | 3/2006 | Mairal et al. | 210/651 |
| 7,146,991 B2 | 12/2006 | Stockert | |
| 7,338,604 B2 * | 3/2008 | Wilson | 210/702 |
| 7,537,696 B2 * | 5/2009 | Arnaud | 210/321.64 |
| 2004/0084373 A1 * | 5/2004 | Wilson | 210/651 |

* cited by examiner

*Primary Examiner* — Ana Fortuna

(74) *Attorney, Agent, or Firm* — Oblon, Spivak, McClelland, Maier & Neustadt, L.L.P.

(57) ABSTRACT

A part washing apparatus includes a centrifugal filter and an ultra filter provided as a single base unit. A washing chamber is provided to enclose one or more industrial parts for cleaning with a washing solution, which is collected in a washer bath. The washing solution is then pumped through a centrifugal filter to remove contaminants from the washing solution and subsequently pumped through an ultra filter a filter configured to remove further contaminants from the washing solution.

24 Claims, 4 Drawing Sheets

WASHER BATH USING CENTRIFUGE AND ULTRA FILTER

BACKGROUND OF THE INVENTION

1. Field of the Invention

This invention generally relates to improving washer performance for machined and all other types of parts that require washing. More particularly, the present invention relates to a washer bath including a filtration system for removing emulsified oil and oil attracted to the soap, dirt and free oil.

2. Description of Related Art

During a typical lathe or other machining operation, metal chips of varying size and shape are formed. After a machining operation, the machined part needs to be cleaned. The cleanliness of the machined part is generally determined by all of the debris and/or oil remaining that is not removed or dissolved by the cleaning solutions.

Industrial washer baths are used to remove the debris such as metal chips as well as swarf (generally smaller particles than the chips), oil, chemical compounds, dirt and the like. Industrial baths are known to include centrifuges or ultra filters. That is, related art washer technology requires using the centrifuge and ultra filter units separately on a washer clean tank. The washer bath life extension process in the related art has not been successful in using an ultra filter or centrifuge separately to extend the washer bath life.

The chips that remain after the machining operation of the part that have not yet been removed from the part, have oil on them and the oil is attracted to the metal of the part and the metal of the chip. The force produced by the weight of the chip is less than the force created by the oil's attraction to the part and chip. The current soap technology uses surfactant or OH— to get between the oil and the part to break the surface tension of the oil/part boundary. When swarf dirt passes thru the filter devices of the related art, the dirt will come into contact with the oil on the part and the swarf is attracted to the oil.

Typically, a water based coolant is used in the process of machining the part and an emulsifier is used the hold to oil molecules to the water molecules. When the coolant is removed from the part in the washer, the this oil will go into solution. However, in the washer bath, this oil will attract swarf in the fluid. As a result, the oil and swarf can be passed through the filter and the dirt can be deposited back onto the part reducing the effectiveness of the cleaning operation.

During use, an ultra filter has the fluid pumped through the inside of the membrane filter. The good soap passes from inside to outside of the membrane and the bad soap, the oil, and swarf stays on the inside of the membrane. The fluid pumped through the inside of the membrane is returned to a tank called a concentrate tank. As the bad soap, oil and swarf percent increases in the concentrate tank, the filter effectiveness decreases. Since the tank has no method of removing swarf and free oil, the fluid flow of the good soap will be stopped and the tank must be dumped. However, the turning on and off of the fluid flow to the ultra filter membranes causes pressure shock to the membrane, which will lower the life of the membrane. Even further, the return from the membrane is above the input to the pump which supplies the membrane. As such, the oil and swarf are kept mixed in the solution. Accordingly, the ultra filters used in the related art require high maintenance, such as cleaning the filter membrane frequently.

In washer baths, the efficacy of the soap used to clean the parts should be tested to determine if the soap can continue to clean the parts. As discussed above, the soap includes chemicals that are attracted to the oil and also includes a surfactant that helps to break the oil and dirt surface tension. If the bath has more oil than chemicals that are attached to the oil, then the soap is used up. The related art does not provide a clean and efficient process to measure this condition or to measure the amount of soap available to clean. The related art soap testing method requires a measurement of the parts to determine when the soap can no longer clean the parts. Further, there is no way to measure the chemicals in the soap to determine if harmful chemicals are being built-up in the bath. Again, the parts must be measured, which is a time consuming process. Accordingly, the related art does not provide a method to measure soap effectiveness.

SUMMARY OF THE INVENTION

According to an aspect of the present invention, it has been recognized that prior washing devices suffer from one or more disadvantages including: having centrifuges and ultra filters provided as separate units, turning on and off of the fluid flow to the ultra filter membranes causing pressure shock to the membrane, and/or requiring a measurement of the parts to determine when the soap can no longer clean the parts.

The present invention relates to improved washer baths that extend the washer bath life with effective bath filtration, the ability to measure soap effectiveness, and bacterial control.

To that end, the present invention is directed to a centrifuge and an ultra filter provided on a single base unit. With such an arrangement, a single power supply and a single control panel can be used to control both the centrifuge and ultra filter.

According to one or more embodiments, the washer bath solution is passed through the centrifuge which cleans the solution and removes free oil, dirt and/or swarf. The solution passing through the centrifuge is passed through the ultra filter to remove any remaining free oil, dirt and/or swarf as well as emulsified oil and/or oil attached to soap.

According to one or more embodiments, the solution passing through the ultra filter is held in a concentrate tank. When the oil concentration in the concentrate tank exceeds a predetermined level and/or time, the centrifuge will stop removing fluid from the washer bath and will remove fluid from the concentrate tank to remove the oil and swarf.

Further, a slow opening valve can be added to the flow path of the fluid to the ultra filter membrane so that when the flow is turned on and off, a shock to the membrane filter is reduced and/or prevented.

In an alternate embodiment, input and return pipes can be provided at opposite ends of the concentrate tank for the ultra filter and dampers are provided to slow down the velocity of the fluid entering and exiting the tank which will allow more free oil separation making it easier to remove.

An electrical rod can be provided in the concentrate tank to control the bacteria growth in the tank.

In accordance with another embodiment of the invention, various parameters of the soap can be measured in the washer bath and/or concentrate tank in order to determine chemical levels so that the levels can be adjusted and the soap can be brought at or near the original composition.

As should be apparent, the invention can provide a number of advantageous features and benefits. It is to be understood that in practicing the invention, an embodiment can be constructed to include one or more features or benefits of embodiments disclosed herein, but not others. Accordingly, it should be understood that the preferred embodiments discussed herein are provided as examples and are not to be construed as limiting, particularly since the embodiments can be formed to practice the invention but do not include each of the features of the disclosed examples.

BRIEF DESCRIPTION OF THE DRAWINGS

The invention will be better understood from reading the description which follows and from explaining the accompanying figures. These are provided solely as non-limiting examples of the invention. In the drawings.

DETAILED DESCRIPTION OF THE PREFERRED EMBODIMENTS

Figure 1:
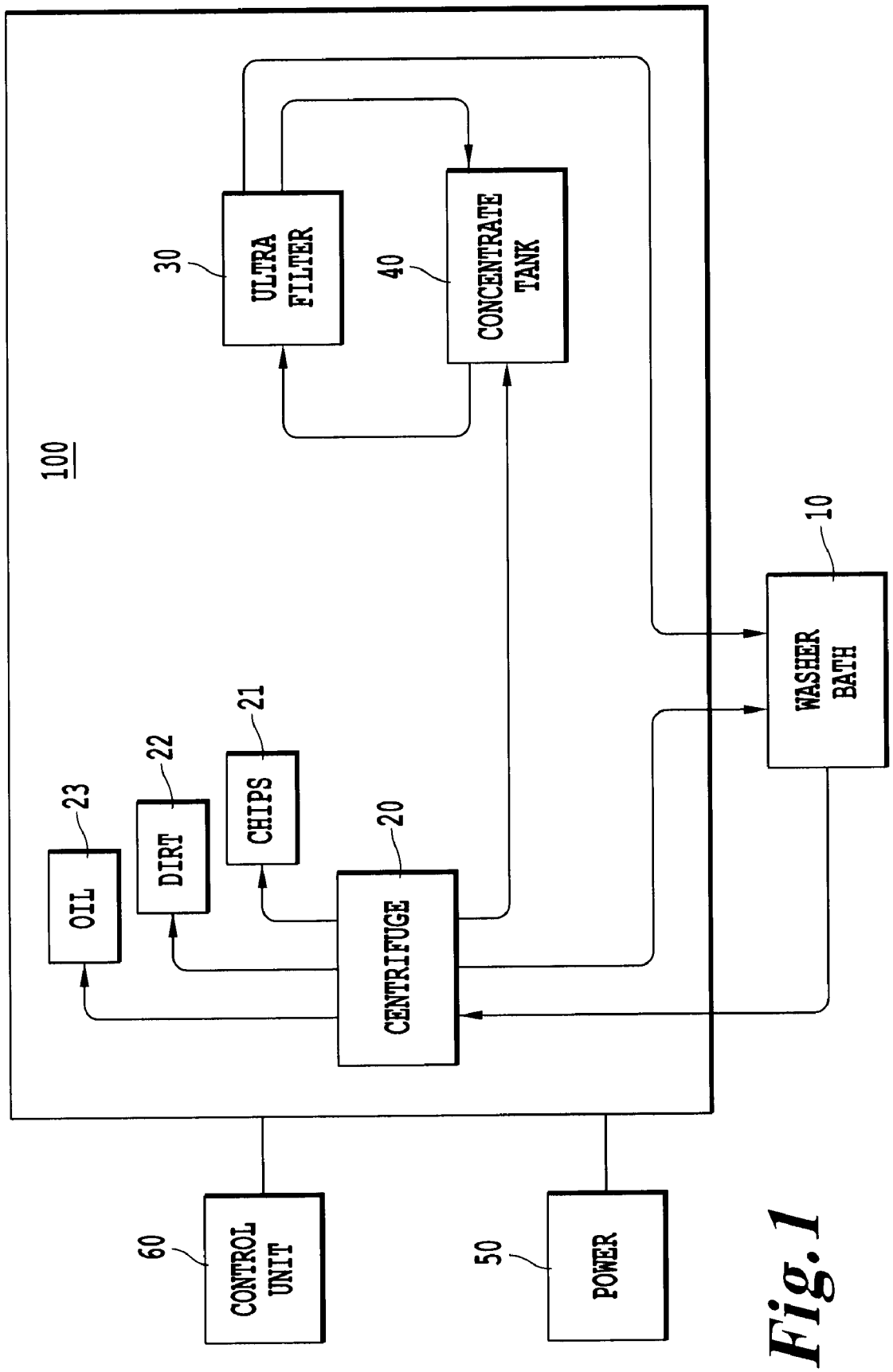
FIG. 1 is a schematic showing a washer device according to an example of the invention.

Reference will now be made in detail to the present preferred embodiments of the invention, examples of which are illustrated in the accompanying drawings. Wherever possible, the same reference characters will be used throughout the drawings to refer to the same or like parts.

As discussed earlier, related art washer technology uses the centrifuge and ultra filter units separately on a washer clean tank and as a result, have not been successful in extending the washer bath life on for example, small tanks. Even if bath life can be extended with the use of larger tanks, process control is not present for checking part cleanliness.

Accordingly, the washer device according to one or more exemplary embodiments of the invention provides a centrifuge and an ultra filter on a single base unit. In this way, the time between cleanings of the ultra filter can be greatly increased and therefore, improving the operational time of the unit.

FIG. 1 is a schematic showing the washing device according to an example embodiment of the invention. The washing device is used to clean any and all types of machined and/or other parts that may include oil, dirt, swarf, and/or chips and the like contained thereon. Generally, the chips are larger particles generated in any metal removing operation, such as when a part is machined in a machining operation or forming or stamping. Swarf is material that is generated in the course of a machining or grinding operation and the oil generally comes from the lubricant used for shipping or lubricants used in the machine, which is leaked into the coolant.

In accordance with the features of the invention, the centrifuge 20 and the ultra filter 30 are provided as a single unit, indicated generally as device 100. A washer bath 10 collects the cleaning solution used to clean the machined parts. That is, after the parts that have been machined are washed in a washing chamber (not shown), the cleaning solution spayed on the parts to clean the parts, is collected in the washer bath 10. As shown in FIG. 1, the washer bath 10 can be connected to and in fluid communication with the centrifuge 20 and ultra filter 30. It should be appreciated that the washer bath 10 and/or washing chamber can be provided with the centrifuge 20 and/or ultra filter 30 as a single unit. The parts to be cleaned can be washed in the chamber as a single item or multiple items at once. Further, the parts can be provided in the chamber continuously or intermittently depending on the parts and the desired processing. The fluid collected in the washer bath 10 is drawn out of the washer bath 10 using a pump for example, and transported to the centrifuge 20. In an example embodiment of the invention, the rate of transfer of the fluid from the bath 10 to centrifuge 20 is 4 gallons per minute. However, it should be appreciated that the flow rate is not limited to 4 gal./min. but can be any desirable rate depending on the amount of fluid to be cleaned, the size of the centrifuge, and the like.

Since the centrifuge 20 and the ultra filter 30 are provided as a single unit, they can be controlled along with their associated elements, by a single control unit 60 in contrast to the multiple control units of the related art for separate centrifuges and ultra filters. Further, due to the single unit 60, the washing device 100 only needs a single power supply 50. With such an arrangement, a single power supply 50 and a single control panel 60 can be used to control both the centrifuge 20 and ultra filter 30. The control unit can include a display (not shown) for a user to monitor the working operations and status of the washing device 100.

The centrifuge 20 serves to separate the oil (or free oil), chips and/or swarf from the liquid cleaning solution. In general, the centrifuge 20 includes a rotating device that directs the oil, chips and/or dirt and swarf material upwardly along an interior surface. According to this process, the chips 21, dirt/swarf 22 and oil 23 are moved upwardly and collected, while the cleaning fluid material passes through a screening material of the centrifuge and is collected and directed out of the centrifuge. In an example of the invention, a bag or cartridge filter can be used to prescreen for example, chips 21 if it is determined that the amount of chips 21 would clog or otherwise render the centrifuge 20 ineffective.

In an embodiment of the invention, the chips 21, dirt/swarf 22 and oil 23 can be manually collected and removed and/or analyzed after the centrifuge is stopped. However, a further example embodiment of the invention allows for an automatic cleaning and/or analyzing of the centrifuge 20 during operation without having to stop the centrifuge. The automatic cleaning can be controlled by the control unit 60. The centrifuge bowl is manually or automatically cleaned to keep track of the particles removed from the fluid such as swarf and oil. If the rate of swarf and/or oil removed from the centrifuge increases, then there could be an issue with, for example, the machining process, and this issue can be addressed by the appropriate person and fixed.

In one or more example embodiments of the invention, the cleaning solution held in the washer bath 10 is passed through the centrifuge 20 which cleans the solution and removes free oil, dirt and/or swarf as discussed above. At least some of the solution exiting the centrifuge 20 is directed to the concentrate tank 40 of the ultra filter 30. In an example embodiment of the invention, the solution leaving the centrifuge 20 is evenly separated with approximately half going back to the washer bath 10 and the remaining solution directed to the concentrate tank 40, such that if the centrifuge 20 is drawing 4 gallons/min. out of the washer bath 10, one example of the invention provides for 2 gallons/min. to go to the washer bath 10 and 2 gallons/min. to go to the concentrate tank 40. In an alternate example embodiment, instead of flowing directly to the concentrate tank 40, at least some of the solution can flow directly to the ultra filter 30.

However, it should be appreciated that the amount of cleaning fluid leaving the centrifuge 20 and directed to the concentrate tank 40 and the washer bath 10 can be divided in any desirable amounts. For example, 3 gallons/min. can be directed to the concentrate tank 40 and 1 gallon/min. can be directed back to the washer bath 10. In an alternate embodiment, all of the cleaning fluid leaving the centrifuge 20 can be directed to the concentrate tank 40 with no fluid returning to the washer bath 10. In an even further example embodiment of the invention, a plurality of concentrate tanks 40 can be provided in fluid communication with the centrifuge 20. In this way, all or part of the cleaning solution leaving the centrifuge 20 can be divided between one or more of the concentrate tanks 40 and the washer bath 10.

The centrifuge 20 is designed to remove the free oil, chips, dirt and swarf. However, the centrifuge 20 is not designed to remove emulsified oil or oil attached to soap.

Accordingly, the fluid directed to the concentrate tank 40 includes at least emulsified oil and oil attached to soap. During use, the fluid in the concentrate tank 40 flows out through pipes and into the ultra filter 30 to remove any remaining free oil, dirt and/or swarf as well as emulsified oil and/or oil attached to soap. After flowing though the ultra filter 30, the fluid that has been cleaned of the emulsified oil or oil attached to soap for example, is collected by piping or the like and directed to the washer bath 10. The remaining fluid is returned to the concentrate tank 40. In accordance with this example embodiment of the invention, by using the centrifuge 20 to remove at least most of the free oil and swarf, the fluid that is collected in the concentrate tank 40 and flows through the ultra filter 30 contains fewer contaminants.

The amount of fluid contained in the concentrate tank 40 and the amount of fluid pumped through the ultra filter 30 can be any desired amount for efficient cleaning of the fluid. As an example, the concentrate tank 40 can hold approximately 100 gallons of fluid and the flow rate though the ultra filter 30 can be approximately 40 gallons per minute. The control and amount of the flow rates can be fixed or variable depending on processing conditions and can be controlled by the control unit 60. It should be appreciated that in example embodiments of the invention, valves can be provided to divert fluid flow to a desired destination. In an alternate example embodiment, instead of flowing directly to the concentrate tank 40, at least some of the fluid from the centrifuge 20 can flow directly to the ultra filter 30. Accordingly, in the example of the invention discussed above, if the centrifuge 20 is drawing approximately 4 gallons/min. out of the washer bath 10 and approximately 2 gallons/min. go back to the washer bath 10 and approximately 2 gallons/min. go to the concentrate tank 40, the ultra filter 30 can return approximately 2 gallons/min. to the washer bath 10. In this way, approximately 4 gallons/min. are being drawn out of the washer bath 10 and approximately 4 gallons/min. are being put back into the washer bath 10.

The combination unit of the centrifuge 20 and the ultra filter 30 combined into a single base unit, allows the fluid leaving the centrifuge 20 to be collected by the concentrate tank 40 associated with the ultra filter 30. That is, the centrifuge 20 pre-cleans the concentrate tank 40 of the ultra filter 30 thus greatly increasing the time between cleanings of the ultra filter. Further, by using the centrifuge 20 to remove the heavy oil, chips and/or dirt and swarf, the ultra filter only has to remove the emulsified oil and the oil attracted to the soap.

As the ultra filter 30 collects more and more of the swarf, dirt, emulsified oil and/or oil attached to soap, the membrane of the ultra filter 30 becomes less effective and the oil and other material contained in the concentrate tank 40 increases. That is, the membrane in the ultra filter 30 has a fixed area of filtering. When this area is plugged off and the oil and/or other contaminant in the concentrate tank exceed an acceptable level, the filter should be cleaned and the concentrate tank 40 should be emptied. Similar to the centrifuge 20, the ultra filter 30 can be cleaned manually or automatically controlled by the control unit 60.

Figure 2:
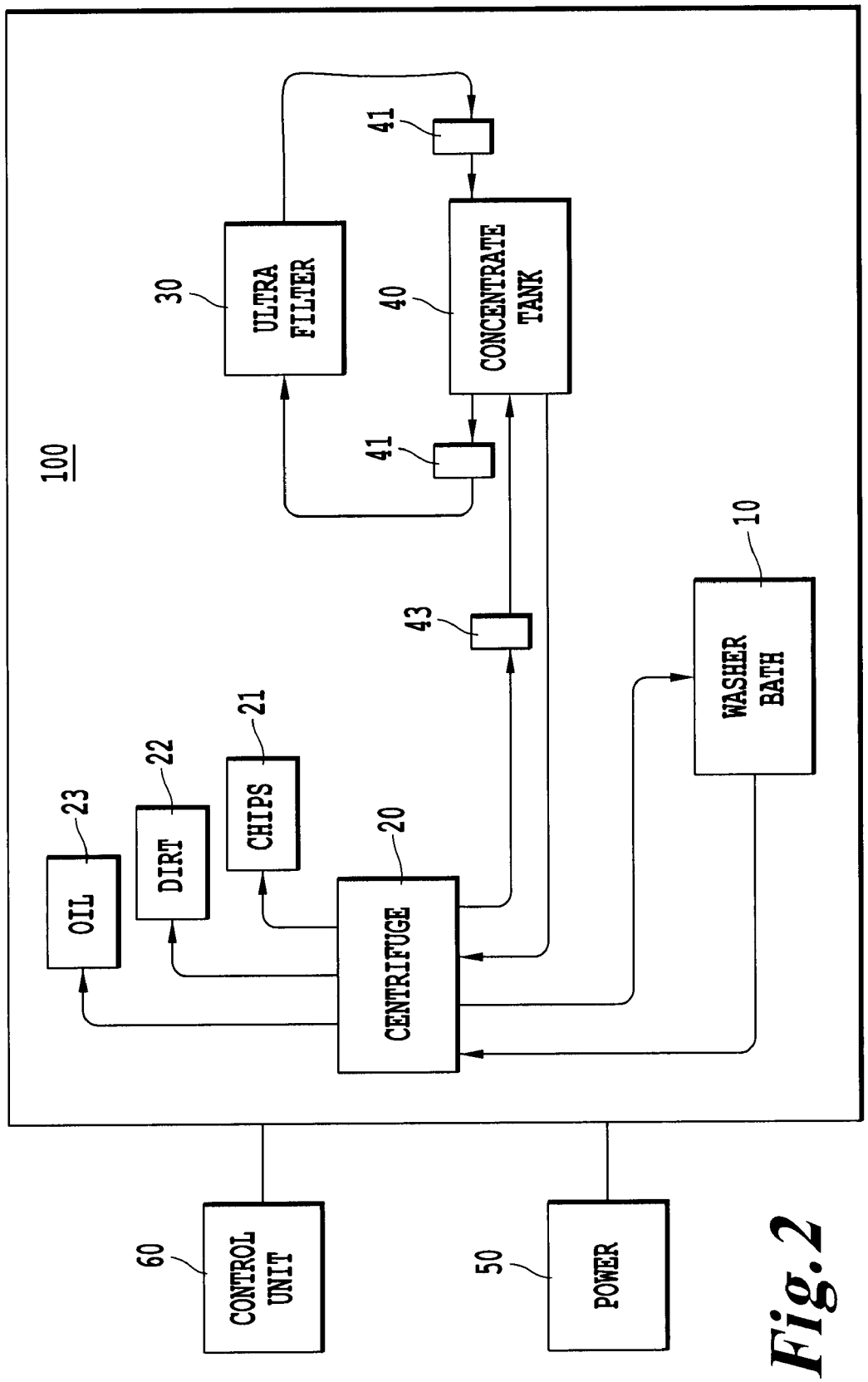
FIG. 2 is a schematic showing a washer device according to an alternate embodiment of the invention.

In another example embodiment of the invention shown in FIG. 2, the amount of oil and swarf the ultra filter 30 encounters is further reduced, improving the efficiency of the washing device 100. In this example, the composition of the washing solution in the concentrate tank is monitored to ensure that the composition is within an acceptable range desired by the user. If the composition is outside an acceptable range, for example if the oil and/or dirt concentration in the concentrate tank 40 is getting to high, the flow to the ultra filter 30 can be turned off. At this time, the centrifuge 20 will stop removing fluid from washer bath 10 and instead will remove fluid from the concentrate tank 40 to help clean the tank and remove the contaminants such as swarf and free oil, leaving only emulsified oils and oil attracted to the soap. After the fluid is run through the centrifuge 20, the fluid returns to the concentrate tank 40 by way of the piping already used to deliver the fluid from the centrifuge 20 to the concentrate tank 40, or by an alternate pipe. The composition in the concentrate tank can be checked either manually or automatically and either continuously or after a predetermined amount of time to achieve a desirable composition of washing fluid. The process discussed with respect to this example embodiment helps improve the effectiveness of the ultra filter 30 and prolong the time period between cleanings of the ultra filter membrane.

As discussed with respect to FIG. 1, the centrifuge 20 and the ultra filter 30 are provided as a single unit and a washer bath 10 collects the cleaning solution used to clean the machined parts. In the example of FIG. 2, the washer bath 10 and/or washing chamber can be provided with the centrifuge 20 and/or ultra filter 30 as a single unit. However, it should be appreciated that in the example of FIG. 2, the washer bath 10 can be provided separate from the single base unit having the centrifuge 20 and ultra filter 30 similar to the example of FIG. 1. In this way, the washer bath 10 can be connected to and in fluid communication with the centrifuge 20 and filter 30 when the washing device is ready for use.

The turning off and on of the ultra filter and the flow thereof causes shock to the membrane of the ultra filter 30. In a further example embodiment of the invention, a slow opening valve is added between the concentrate tank 40 and the ultra filter 30. In this way, shock to the ultra filter 30 is eliminated and the life of the ultra filter is prolonged.

In a further example embodiment of the invention, the input and return pipes to opposite ends of the concentrate tank can include dampers 41. The dampers 41 slow down the velocity of the fluid into and out of the concentrate tank 40 and allow more oil to float to the top of the tank. It should be appreciated that the dampers 41 can be provided inside or outside the concentrate tank. When the oil is allowed to float to the top, a skimmer can be utilized to remove the oil which will further reduce the amount of oil flowing through the membrane of the ultra filter 30 and increase the time between cleanings of the ultra filter.

Since the centrifuge 20 might not remove all of the dirt or swarf, a cartridge filter 43 can be provided in the flow path between the centrifuge 20 and the ultra filter 30. In this way, at least a part of the fluid can be directed through the cartridge filter 43, which will remove at least swarf and/or dirt, for example, from the fluid and reduce the amount of swarf and/or dirt sent through the ultra filter 30.

Related art washer tanks provided a source for bacteria growth if chemicals were not added to kill the bacteria. High levels of bacteria growth reduce the performance of the ultra filter 30 and also can cause a bad odor, which is unpleasant to the users of the apparatus. To address this problem, an electrical rod can be added to the concentrate tank 40 to control and/or kill bacterial growth in the tank 40. By controlling the bacteria, the fluid life can be extended and the filter's effectiveness can be improved.

In an alternate embodiment, the washer bath 10 includes an opening to allow a user to extract and analyze the chemical composition of the cleaning fluid. Based on the analysis, a user can add chemicals needed to bring the concentration of the cleaning product such as soap, back to its original or desired formula and extend the bath life which will reduce expensed. It should be appreciated that the opening can also be provided with the concentrate tank 40 for measuring the composition of the cleaning solution.

In a further example embodiment, a sensor can be provided with the washer bath 10 and/or concentrate tank 40 to automatically and/or continuously or after a predetermined processing time, monitor the chemical composition of the solution. For example, the sensor could detect surfactants, emulsified oil and/or ion/salt buildup in the solution contained in the washer bath 10. Further, the sensor could detect for example, oil and dirt contained in the concentrate tank 40. The measuring by the sensor can be controlled by control panel 60 and alerts can be displayed when the solution contained in either or both of the bath 10 and tank 40 are outside an acceptable range. The sensor can monitor the solution and the parameters can be plodded for process control. By measuring the effectiveness of cleaning fluid, it is not necessary to check the machined parts themselves for cleanliness, as performed by the related art. Utilizing the procedure of this example, will reduce cost and increase the life of the various elements of the washer device 100.

Figure 3:
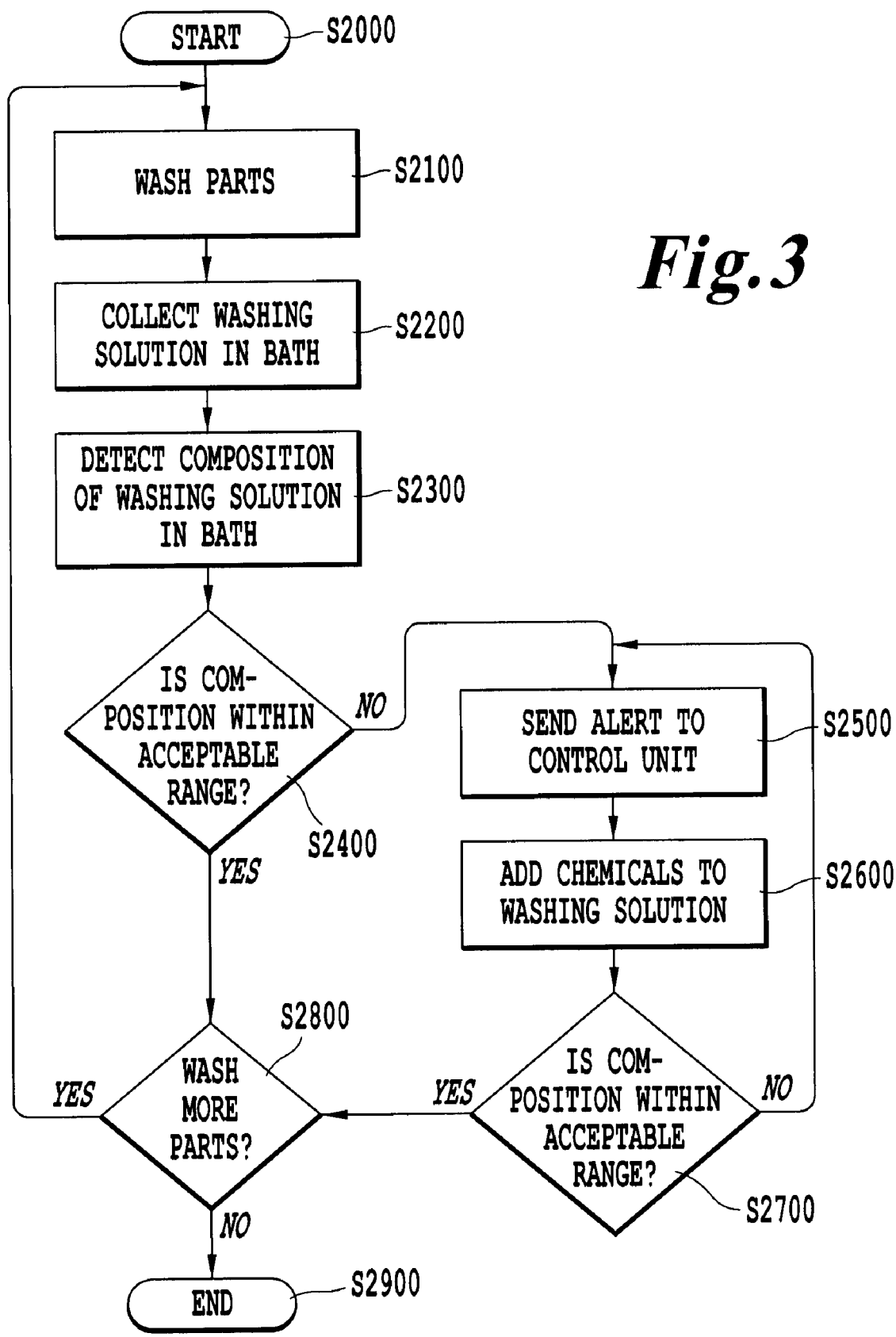
FIG. 3 is a flowchart showing one example embodiment of a process of improving washer performance for machined parts.

FIG. 3 shows a flowchart directed to a method for improving washer performance for machined parts according to a further example embodiment of the invention. The process starts at step S2000. In step S2100, parts are washed, for example continuously in a washing chamber with a washing solution. After the washing solution is collected in a washer bath in step S2200, the composition of the washing solution contained in the washer bath is detected in step S2300. In step S2400, it is determined whether the composition of the washing solution is within an acceptable range. If the composition is not within an acceptable range, process flows to step S2500 where an alert is sent to the washer apparatus control unit. In step S2600, the composition of the washing solution of the washer bath is adjusted by adding for example soap, chemicals, and the like until the composition is within the desired range. When the composition is within the desired range, process proceeds to step S2800 where it is determined if more parts need to be washed. If more parts are to be washed, the process returns to step S2100. If no more parts are to be washed, the process ends at step S2900.

Figure 4:
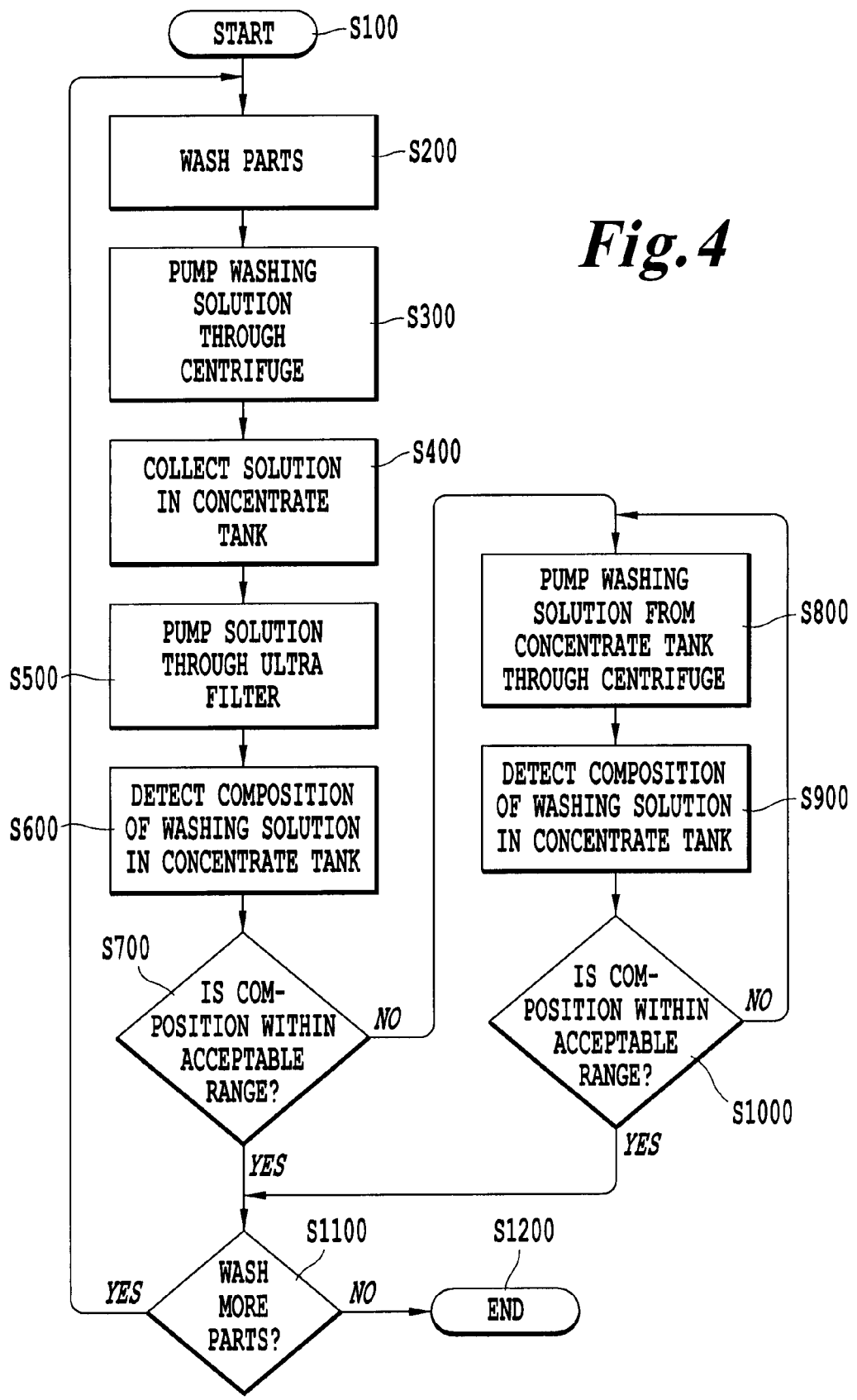
FIG. 4 is a flowchart showing an example embodiment of washing a machined part.

FIG. 4 shows a flowchart directed to a method for improving washer performance for machined parts according to an example of the invention. The process starts at step S100. In step S200, parts are washed, for example continuously with a washing solution. After the washing solution is collected in a washer bath, the washing solution is pumped through the centrifuge in step S300. In step S400, the washing solution is collected in a concentrate tank. Next, the washing solution is pumped through the ultra filter in step S500. The composition of the washing solution contained in the concentrate tank is detected in step S600. In step S700, it is determined whether the composition of the washing solution is within an acceptable range. If the composition is not within an acceptable range, process flows to step S800 where the washing solution is pumped from the concentrate tank through the centrifuge. In step S900, the composition of the washing fluid is detected and in step S1000, it is determined whether the composition is within a desirable range. If the composition is outside the range, then process flows back to step S800 where the washing solution is continued to be pumped from the concentrate tank through the centrifuge. If the composition is within the desired range, process proceeds to step S1100 where it is determined if more parts are to be washed. If more parts are to be washed, the process returns to step S200. If no more parts are to be washed, the process ends at step S1200.

Further, it should be appreciated that the exemplary embodiments of the invention are not limited to the exemplary replaceable toe portion shown and described above. While this invention has been described in conjunction with exemplary embodiments outlined above, various alternatives, modifications, variations and/or improvements, whether known or that are, or may be, presently unforeseen, may become apparent. Accordingly, the exemplary embodiments of the invention, as set forth above are intended to be illustrative, not limiting. The various changes may be made without departing from the spirit and scope of the invention. Therefore, the replaceable toe portion of a shoe and the systems and methods of replacing the toe portion according to exemplary embodiments of this invention are intended to embrace all now known or later-developed alternatives, modifications, variations and/or improvements.

The invention claimed is:

1. A washing solution cleaning apparatus, comprising:
    a base unit;
    a washer bath;
    a centrifugal filter secured to the base unit and configured to remove contaminants from a washing solution from said washer bath that is pumped through the centrifugal filter;
    a concentrate tank configured to collect the washing solution exiting the centrifugal filter, and to direct fluid to the centrifugal filter, an ultra filter or the washer bath;
    the ultra filter secured to the base unit and located in the fluid flow path of the washing solution leaving the centrifugal filter, the ultra filter configured to remove further contaminants from the washing solution and direct filtered fluid to the concentrate tank and/or the washer bath; and
    an activating unit that analyzes the washing solution to determine a chemical composition of the washing solution;
    wherein the analysis is performed by a sensor associated with at least one of the washer bath and concentrate tank, and results of the analysis are automatically provided to a control unit electrically connected to the centrifugal filter and ultra filter to operate the centrifugal and ultra filter to direct fluid to the washer bath depending on its composition.

2. The washing solution cleaning apparatus as recited in claim 1,
    wherein the washing solution is pumped through the ultra filter from the concentrate tank, the washing solution exiting the ultra filter is returned to the concentrate tank.

3. The washing solution cleaning apparatus as recited in claim 2, wherein exit piping from the concentrate tank is located at a first end of the concentrate tank, and return piping for the washing solution pumped through the ultra filter is located at a second end of the concentrate tank opposite the first end.

4. The washing solution cleaning apparatus as recited in claim 3, further comprising:
    a damper connected to the piping of at least one of the exit piping and the return piping.

5. The washing solution cleaning apparatus as recited in claim 2, further comprising:
a cartridge filter positioned in the fluid flow path between the centrifugal filter and the concentrate tank.

6. The washing solution cleaning apparatus as recited in claim 2, wherein the concentrate tank includes an electrical rod.

7. The washing solution cleaning apparatus as recited in claim 1, wherein at least a portion of the washing solution exiting the ultra filter is returned to the concentrate tank and a portion is returned directly to the washer bath.

8. The washing solution cleaning apparatus as recited in claim 1,
wherein the control unit is electrically connected to the centrifugal and ultra filters and is configured to control the centrifugal and ultra filters.

9. The washing solution cleaning apparatus as recited in claim 1, further comprising:
a single power unit configured to provide power to both the centrifugal filter and the ultra filter.

10. The washing solution cleaning apparatus as recited in claim 1, wherein the centrifugal filter removes at least one of oil, swarf, dirt and chips, and the ultra filter removes at least one of oil, swarf, dirt, chips, emulsified oil, and oil attached to soap.

11. The washing solution cleaning apparatus as recited in claim 1, wherein the washer bath includes an opening to allow a sample to be taken of the washing solution.

12. The washing solution cleaning apparatus as recited in claim 1, wherein the parts to be cleaned are machined industrial parts.

13. A method of cleaning a washing solution, comprising:
providing a filtration system comprising: a base unit;
a washer bath collecting a washing solution;
pumping washing solution through a centrifugal filter to remove contaminants from the washing solution, the centrifugal filter being secured to the base unit; pumping the washing solution from the centrifugal filter to a concentrate tank;
collecting the washing solution exiting the centrifugal filter in the concentrate tank;
pumping the washing solution from the concentrate tank through an ultrafilter to remove further contaminants from the washing solution, the ultra filter is arranged for directing filtered washing solution to the concentrate tank and/or to the washer bath, the ultra filter being secured to the base unit;
analyzing the washing solution to determine a chemical composition;
wherein the analysis is performed by a sensor associated with at least one of the washer bath and concentrate tank, and results of the analysis are automatically provided to a control unit electrically connected to the centrifugal and ultra filter to operate the centrifugal and ultra filter to direct the filtered washing solution to the washer bath depending on its composition.

14. The method of cleaning a washing solution as recited in claim 13, further comprising:
returning the washing solution exiting the ultra filter to the concentrate tank.

15. The method of cleaning a washing solution as recited in claim 14, further comprising:
pumping the washing solution through piping located at a first end of the concentrate tank, to the ultra filter; and
returning the washing solution from the ultra filter to the concentrate tank through piping located at a second end of the concentrate tank opposite the first end.

16. The method of cleaning a washing solution as recited in claim 14, wherein at least a portion of the washing solution exiting the ultra filter is returned to the concentrate tank and a portion is returned directly to the washer bath.

17. The method of cleaning a washing solution as recited in claim 14, further comprising:
slowing down a velocity of the washing solution at least one of exiting and returning to the concentrate tank.

18. The method of cleaning a washing solution as recited in claim 13, further comprising:
controlling the centrifugal filter and ultra filter by the control unit that is electrically connected to the centrifugal filter and ultra filter; and
powering the centrifugal filter and ultra filter by power unit.

19. The method of cleaning a washing solution as recited in claim 13, further comprising:
stopping flow of the washing solution from the washer bath to the centrifugal filter;
pumping washing solution from the concentrate tank through the centrifugal filter to remove contaminants from the washing solution; and
pumping the washing solution from the centrifugal filter back to the concentrate tank.

20. The method of cleaning a washing solution as recited in claim 13, wherein the centrifugal filter removes at least one of oil, swarf, dirt and chips, and the ultra filter removes at least one of oil, swarf, dirt, chips, emulsified oil, and oil attached to soap.

21. The method of cleaning a washing solution as recited in claim 13, further comprising:
alerting a user with at least one of an audible noise and a visual display on the control unit, if the analysis detects that the chemical composition is outside a desirable range.

22. The method of cleaning a washing solution as recited in claim 21, further comprising:
cleaning at least one of the centrifugal filter and ultra filter when the amount of contaminants associated with one of the filters exceeds a maximum amount.

23. The method of cleaning a washing solution as recited in claim 13, further comprising:
manually extracting a portion of the washing solution through an opening in a side surface of the washer bath to analyze the chemical composition of the washing solution.

24. The method of cleaning a washing solution as recited in claim 13, further comprising:
adding one or more components of the washing solution to the washer bath through an opening in a side wall of the washer bath when the chemical composition is outside a desirable range.

\* \* \* \* \*